United States Patent Office 3,433,845
Patented Mar. 18, 1969

3,433,845
PROCESS OF SOLUBILIZING, VIA HYDROGENATION, ALPHA-METHYLSTYRENE POLYMERS AND PRODUCT OBTAINED THEREBY
Stephen M. Kovach, Highland, Ind., and Robert A. Sanford and David W. Young, Homewood, Ill., assignors to Sinclair Research, Inc., New York, N.Y., a corporation of Delaware
No Drawing. Filed Mar. 14, 1966, Ser. No. 541,435
U.S. Cl. 260—667      8 Claims
Int. Cl. C08f 27/25

ABSTRACT OF THE DISCLOSURE

Alpha-methylstyrene polymers having a molecular weight of about 300 to 200,000, preferably about 350 to 80,000, are rendered more soluble in, for example, aromatic solvents, drying oils, hydrocarbon resins, polyesteramides, phenolic resins, polyvinyl chloride resins, paraffin waxes, mineral oils, etc., by hydrogenating at least about 70, preferably at least about 90, percent of the aromatic unsaturation of the polymers. In addition to alpha-methylstyrene homopolymers, there may also be subjected to the treatment, in order to increase their solubility, properties, copolymers of alphamethylstyrene and up to about 40 weight percent of one or more copolymerizable monomers selected from the group consisting of styrene and diene hydrocarbons of 4 to about 12 carbon atoms.

---

This invention relates to a method of altering the solubility properties of polymers of alpha-methylstyrene and to the improved polymers produced thereby. More particularly, it relates to the hydrogenation of alpha-methylstyrene polymers to an extent that the polymers are rendered quite soluble in otherwise immiscible organic materials.

Alpha-methylstyrene polymers have had limited use as modifying ingredients in formulations such as lubricants, coating compositions, molding compositions, etc., due to their immiscibility in nearly all aliphatic hydrocarbons, high viscosity mineral oils, waxes, drying oils, hydrocarbon resins, polyamides, and so on. Until now they have been used almost exclusively as additives in coumarone-indene resins, rosin esters and polystyrene. In order to provide clear films, uniform viscosity products and overall compatibility from such blends it is necessary that the alpha-methylstyrene polymer be miscible with the other ingredients. The miscibility of the components is an indication of their compatibility and directly affects the strength of articles cast or molded therefrom. For example, a clear film cast from a solution of miscible resinous components will most often exhibit greater strength than a cloudy film resulting from a simple mixture of incompatible components. If it were somehow possible to extend the limited solubility of alpha-methylstyrene polymers to embrace a latitude of resins, waxes and other organic materials, their excellent chemical and physical properties could be lent to a wider variety of lubricating, coating, molding, etc., compositions.

It has now been found that by hydrogenating at least about 70 percent, preferably at least about 90 percent, of the aromatic structure of alpha-methylstyrene polymers, (i.e., reducing the aromatic unsaturation to a value of approximately 0 to 30 percent, preferably less than 10 percent, based upon the theoretical value of 100 percent for the unhydrogenated alpha-methylstyrene polymer) there is effected such a significant change in solubility properties of the polymers that they are readily miscible in practically all proportions with otherwise immiscible substances such as asphalt, grease, polyethylene, polybutene, neoprene rubber and high-viscosity-index mineral oils.

According to the present invention, the polymers of alpha-methylstyrene, of which the solubility characteristics are enhanced through hydrogenation, are homopolymers of alpha-methylstyrene, or copolymers of alpha-methylstyrene with styrene and/or diene hydrocarbons having about 4 to 12 carbon atoms. Typical dienes which may be employed are 1,3-butadiene, isoprene, 2,3-dimethyl-1,3-butadiene, etc. Preferred polymers are those wherein at least about 60 weight percent thereof is made up of combined alpha-methylstyrene. Molecular weights of the polymers are in the range of about 300 to 200,000, preferably about 350 to 80,000, embracing polymers varying in physical state from normally viscous liquids to solid, hard resins.

Any hydrogenation procedure which reduces the unsaturation of aromatic hydrocarbons can be employed in the method of this invention. Thus, for example, although the reaction can take place at room temperatures and atmospheric pressures, more often temperatures from about 150° F. to 480° F., preferably 210° F. to 420° F., and pressures from about 500 to 2500 lbs./sq. inch, preferably 700 to 1500 lbs./per sq. inch, will be employed. Other suitable conditions may include a liquid hourly space velocity (LHSV) of about 0.1 to 10, preferably 0.1 to 2, and a molar ratio of hydrogen to polymer of about 1 to 50, preferably 5 to 10.

The hydrogenation is preferably carried out in the presence of molecular hydrogenation catalysts capable of promoting the hydrogenation such as, for example, metals, especially those of Group VI thru Group VIII of the Periodic Table, or their compounds, particularly their oxides and sulfides, either alone or in various mixtures with each other, or on carrier materials such as silica, zinc oxide, alumina, charcoal, kieselguhr, etc.

The hydrogenation can advantageously be conducted in the presence of a suitable organic solvent, most often one which is inert to the hydrogenation conditions such as, for instance, paraffins, naphthenes and steric hindered unsaturated hydrocarbons. The value of the hydrogenated product, however, will sometimes justify the use of hydrogenatable solvents such as aromatic or olefinic solvents, e.g., benzene, toluene, allo-ocimene, polymeric solvents, etc. Any practical amount of solvent may be employed; a weight ratio of solvent to polymer of from about 0.1 to 10, for example, is often suitable while a ratio of from 0.1 to 5 is preferred.

The invention is illustrated by the following examples.

Example I

Two commercially available homopolymers of alpha-methylstyrene, designated A and B, which exhibited generally good solubility is aromatic hydrocarbons but which were insoluble in aliphatic hydrocarbons such as polybutene, were subjected to the hydrogenation conditions outlined in Table I below. These experiments were performed in a stainless steel Universal 1″ I.D. reactor heated by a radiant heat furnace. The temperature of the reactor was controlled by Fenwall thermostats and the temperature of the catalyst bed was measured by means of chromel-alumel thermocouples located throughout the bed. The hydrocarbon feed was charged to the reactor by means of a Lapp pump and the diluent gas, hydrogen, was metered to the reactor through a Fischer-Porter armored rotameter. (The effluent gas was measured by means of an American wet-test meter.) The liquid product was separated from the effluent gas in a Jerguson liquid-level gauge and then released to atmospheric pressure at room temperature after which the liquid products were subjected to distillation to strip the solvent from the polymers. The degree of saturation of the polymers was determined by measuring the hydrogen in and out of the reactor and in some cases by Nuclear Magnetic Resonance.

Prior to hydrogenation, polymers A and B exhibited the following physical and chemical propetries:

Polymer A

| | |
|---|---|
| Softening point, ° F. (ring and ball) | 210 |
| Viscosity, Gardner-Holdt (60% in toluene) | G–H |
| Color, Gardner (50% in toluene) | 2 |
| Iodine number, Wijs | Nil |
| Acid number | Nil |
| Saponification number | Nil |
| Ash | .001 |
| Specific gravity, 60/60° F. | 1.07 |
| Molecular weight | 670 |
| Flash point, ° F. | 410 |
| Refractive index (20° C.) | 1.61 |

Polymer B

| | |
|---|---|
| Color | Water, white |
| Boiling range (5%–90%) at 5 mm. Hg, ° C. | 150–300 |
| Specific gravity at 60/60° C. | 1.04 |
| Pounds/gallon at 25° C. | 8.66 |
| Viscosity at 60° C., centipoises | 700–1000 |
| Flash point (approximately), ° C. | 182 |
| Fire point, ° C. | 207 |
| Volatility—100 hrs. at 100° C., percent | 18–20 |
| Refractive index at 60° C. | 1.57 |
| Acid number | <0.1 |
| Iodine number | <4.1 |
| Dielectric constant $10^3$ c.p.s.) | 2.60 |
| Dissipation factor ($10^3$ c.p.s.) | 0.0005 |
| Color (iodine standard) | 0.85 |

Polymers A and B were hydrogenated according to the above procedure under the conditions outlined in the table. The extent of hydrogenation of the aromatic structure of the polymers is reported in Table I.

TABLE I

| | Run | | | | |
|---|---|---|---|---|---|
| Resin | 1 | 2 | 3 | 4 | 5 |
| | B | B | B | B | A |
| Polymer | (1) | (1) | (1) | (1) | (2) |
| Solvent | (3) | (3) | (3) | (3) | (4) |
| Polymer/Solvent, Wt. | 1/4 | 1/4 | 1/2 | 3/7 | 1/6 |
| Catalyst | | | 0.6% Pt/Al₂O₃ | | |
| Conditions: | | | | | |
| Temperature, °F. | 250 | 290 | 300 | 400 | 350 |
| Pressure, p.s.i.g. | 800 | 800 | 1,000 | 1,000 | 1,000 |
| LHSV [5] | 0.5 | 0.5 | 0.5 | 0.5 | 0.5 |
| H₂/H'C [6] | 7/1 | 7/1 | 7/1 | 7/1 | 7/1 |
| Product, Aromatic Content Hydrogenated, percent | 90 | 90 | 97 | 100 | 96 |

[1] Trimer.
[2] Hexamer.
[3] n=Heptane.
[4] "Decalin".
[5] Liquid hourly space velocity, i.e., the volume of feed processed per volume of catalyst per hour.
[6] Molar ratio of hydrogen to poly alpha=methylstyrene.

The hydrogenated alpha-methylstyrene polymers of Table I are soluble over a concentration range of 1%, 10%, 50% and 90% in aromatic solvents, drying oils, hydrocarbon resins, polyesteramides, phenolic resins polybutenes, polyvinyl chloride resins, vinyl chloride-vinyl acetate copolymers, polyethylene, carnauba, montan and paraffin waxes, and mineral oil. The hydrogenated resins are of good color and are useful as film-forming ingredients, in low cost hydrocarbon solvents such as mineral spirits and VMP naphtha.

Example II

A homopolymer of alpha-methylstyrene having a molecular weight of 12,800 was tested for solubility in a paraffin wax of 124° F. melting point. At 5% polymer concentration and 140° F. the polymer and wax were observed to be immiscible and the resultant blend to be cloudy. The alpha-methylstyrene polymer was then hydrogenated in a manner similar to Example I. When blended with the same paraffin wax at 140° F. the hydrogenated polymer readily dissolved and a clear solution of polymer in wax resulted.

Example III

The solubility of the alpha-methylstyrene polymers identified in Tables II and III below in drying oils, hydrocarbon resins and phenolic resins is improved when about 90% of the aromatic structure thereof is hydrogenated.

TABLE II

| Polymer | C | D |
|---|---|---|
| Softening Point, ° F. (Ring and Ball) | 290 | 240 |
| Viscosity, Gardner-Holdt (60% in Toluene) | Z–Z₃ | P–Q |
| Color, Gardner (50% in Toluene) | 2 | 2 |
| Iodine Number, Wijs | Nil | Nil |
| Acid Number | Nil | Nil |
| Saponification Number | Nil | Nil |
| Ash | .001 | .001 |
| Powers Cloud Point, ° F. | 265 | 210 |
| Specific Gravity, 60/60° F. | 1.07 | 1.07 |
| Molecular Weight | 1,030 | 810 |
| Flash Point, ° F. | 475 | 435 |
| Refractive Index (20° C.) | 1.61 | 1.61 |
| Dielectric Constant (900 kc.) | 2.5785 | |
| Dissipation Factor (900 kc., 25° C.) | 0.00014 | |
| DC Volume Resistivity, ohm-cm. (500 Volts, 23° C.) | $10^{16}$–$10^{17}$ | |

TABLE III

| | |
|---|---|
| Polymer | E |
| Color | Water white |
| Boiling range (5%–90%) at 5 mm. Hg., ° C. | 150–300 |
| Specific gravity at 60/60° C. | 1.01 |
| Pounds/gallon at 25° C. | 8.40 |
| Viscosity at 60° C., centipoises | 100–200 |
| Flash point (approximately), ° C. | 166 |
| Fire point, ° C. | 182 |
| Volatility—100 hrs. at 100° C. percent | 28–32 |
| Refractive index at 60° C. | 1.58 |
| Acid number | <0.1 |
| Iodine number | <4.0 |
| Dielectric constant ($10^3$ c.p.s.) | 2.56 |
| Dissipation factor ($10^3$ c.p.s.) | 0.0001 |

It is claimed:

1. A method of improving the solubility characteristics of an addition polymer of about 60–100 weight percent of alpha-methylstyrene and about 0–40 weight percent of copolymerizable monomers selected from the group consisting of styrene and diene hydrocarbons of 4 to about 12 carbon atoms, said polymer having a molecular weight of about 300 to 200,000, which consists essentially of catalytically hydrogenating said polymer to the extent that at least about 70 percent of the aromatic unsaturation of the polymer is hydrogenated.

2. The method of claim 1 wherein the catalyst employed consists essentially of platinum supported on alumina.

3. The method of claim 1 wherein the hydrogenation is conducted at temperatures from about room temperature to 480° F. and under pressures from about atmospheric pressure to 2500 lbs./sq. inch.

4. The method of claim 3 wherein the hydrogenation is carried out with a molar ratio of hydrogen to hydrocarbon of about 1 to 50 and an LHSV of about 0.1 to 10.

5. A hydrogenated addition polymer of about 60–100 weight percent of alpha-methylstyrene and about 0–40 weight percent of copolymerizable monomers selected from the group consisting of styrene and diene hydrocarbons of 4 to about 12 carbon atoms, said polymer having a molecular weight of about 300 to 200,000 and characterized by having an aromatic unsaturation content of less than about 30 percent of theoretical.

6. The hydrogenated polymer of claim 5 having a molecular weight of about 350 to 80,000.

7. The hydrogenated polymer of claim 5 having an aromatic unsaturation content of less than about 10 percent of theoretical.

8. The hydrogenated polymer of claim 5 consisting essentially of polymerized alpha-methylstyrene.

References Cited

UNITED STATES PATENTS

| | | | |
|---|---|---|---|
| 3,370,010 | 2/1968 | Isaacsou | 252—59 |
| 3,336,409 | 8/1967 | Russell | 260—669 |
| 2,603,655 | 7/1952 | Strain | 260—669 |
| 2,732,371 | 1/1956 | Wehr | 260—669 |
| 2,898,387 | 8/1959 | Teter | 260—667 |
| 3,352,934 | 11/1967 | House | 260—669 |
| 3,192,218 | 6/1965 | Solomon | 260—667 |
| 3,268,608 | 8/1966 | DeRosset | 260—668 |

FOREIGN PATENTS 1,196,186  7/1965  Germany.

DELBERT E. GANTZ, *Primary Examiner.*

V. O'KEEFE, *Assistant Examiner.*

U.S. Cl. X.R.

260—666, 669, 93.5